United States Patent [19]

Beidler

[11] Patent Number: 4,540,186
[45] Date of Patent: Sep. 10, 1985

[54] ANTI-ROTATION DEVICE FOR CONTRACTING ROD RING SEALS

[75] Inventor: Glenn S. Beidler, Vicksburg, Mich.

[73] Assignee: Pneumo Corporation, Boston, Mass.

[21] Appl. No.: 695,725

[22] Filed: Jan. 28, 1985

[51] Int. Cl.³ .................. F16J 15/26; F16J 15/54
[52] U.S. Cl. .................... 277/195; 277/198;
        277/199; 277/166; 277/188 R; 277/220
[58] Field of Search ............ 277/166, 167.3, 192–195,
                        277/198, 199, 220, 188 R

[56] References Cited

U.S. PATENT DOCUMENTS

| | | | |
|---|---|---|---|
| 1,106,678 | 8/1914 | Ragan . | |
| 1,336,670 | 4/1920 | Anderson . | |
| 1,360,535 | 11/1920 | Kelly | 277/198 |
| 1,424,377 | 8/1922 | Ray . | |
| 1,699,454 | 1/1929 | Starr | 277/195 |
| 2,052,160 | 4/1935 | Barnes | 309/29 |
| 2,481,552 | 9/1949 | Williams | 309/44 |
| 4,371,178 | 2/1983 | Ott | 277/193 X |

FOREIGN PATENT DOCUMENTS

| | | | |
|---|---|---|---|
| 137302 | 3/1930 | Switzerland | 277/188 R |
| 394892 | 1/1933 | United Kingdom . | |
| 1315831 | 5/1973 | United Kingdom | 277/220 |
| 1395196 | 5/1975 | United Kingdom | 277/199 |

Primary Examiner—Robert S. Ward
Attorney, Agent, or Firm—Maky, Renner, Otto & Boisselle

[57] ABSTRACT

Anti-rotation device consists of a thin washer having a pair of circumferentially and radially spaced tabs protruding axially from one side thereof which are adapted to be received in the gaps in the inner and outer rings, respectively, of a circumferential ring seal to prevent the gaps from aligning themselves. The tabs are desirably located approximately 180° apart to keep the ring gaps on diametrically opposite sides of the seal.

14 Claims, 3 Drawing Figures

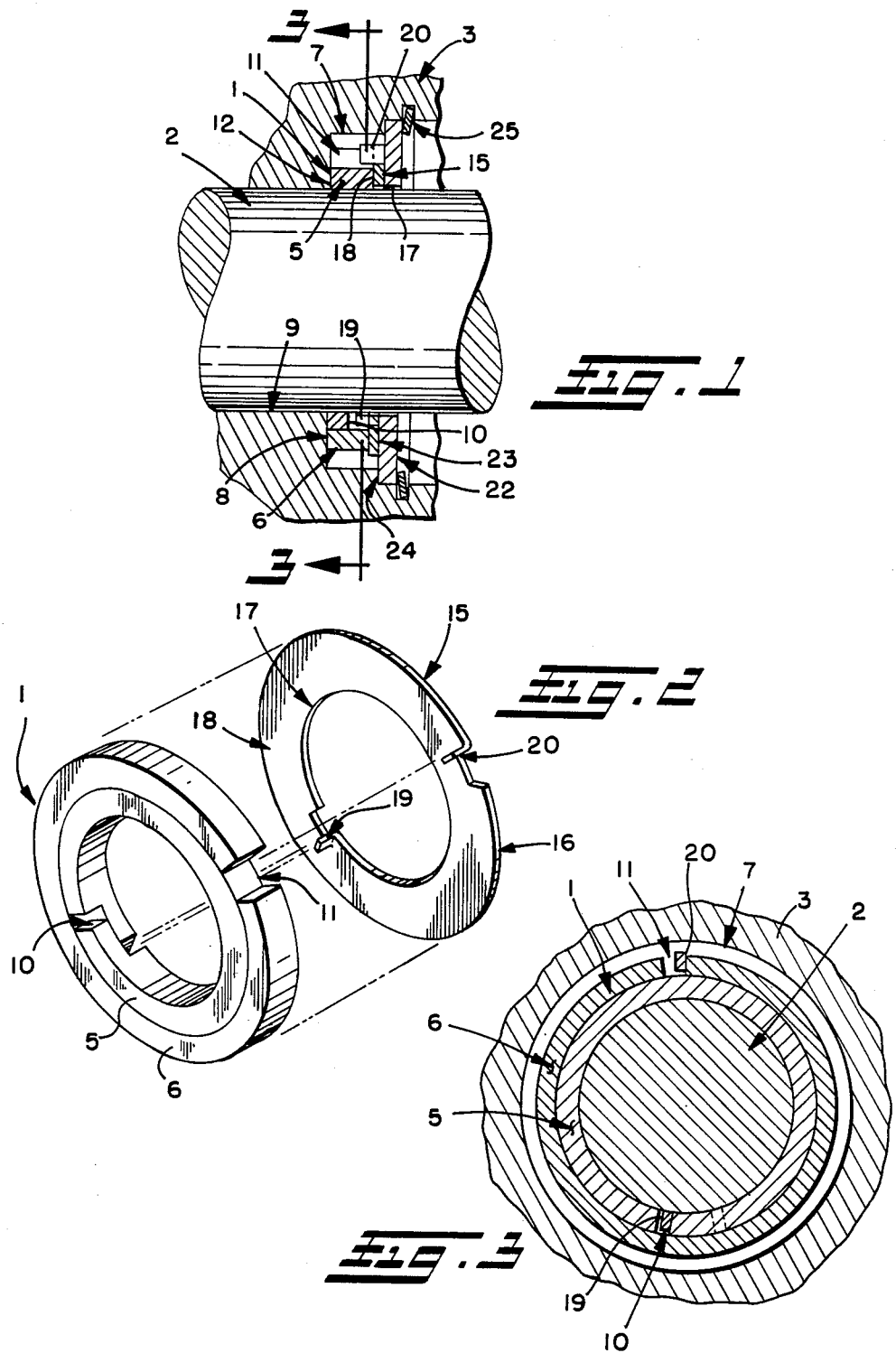

ANTI-ROTATION DEVICE FOR CONTRACTING ROD RING SEALS

BACKGROUND OF THE INVENTION

This invention relates generally as indicated to an anti-rotation device for contracting rod ring seals and more particularly to a device for preventing relative rotation between the inner and outer rings of a contracting rod ring seal or other such multi-ring circumferential seal to prevent the gaps in the rings from aligning themselves.

A typical contracting rod ring seal consists of a step cut inner ring and a straight cut outer ring concentrically disposed about the inner ring. Such a seal is normally used to seal in one direction against high pressure fluid or gas leakage around a rod protruding from a pressure vessel. In certain instances, the cuts or gaps in the inner and outer rings will align themselves due to combinations of pressure cycling, rod motion and/or vibration and the like. With the gaps aligned, the seal develops excessive leakage making it unsuitable for its intended function.

Heretofore, in some applications it has been possible to maintain the ring gaps out of alignment with each other by providing a pin between the rings or in the outer ring protruding into the gap in the inner ring. However, in other applications requiring smaller, thinner rings the drilling of holes and installing of pins can cause distortion of the rings and consequent leakage.

It is also known to provide a stress transmitting band in opposed grooves in the concentric rings to prevent the rings from rotating relative to each other. Such relative rotation of the rings is prevented by axially and circumferentially spaced detents on the band which project into the gaps in the respective rings. However, the forming of such grooves in the rings for receipt of the band has similar drawbacks to the drilling of holes and installing of pins especially in applications requiring smaller, thin rings.

SUMMARY OF THE INVENTION

With the foregoing in mind, it is a principal object of this invention to provide an anti-rotation device for maintaining the desired misalignment of the gaps in the inner and outer rings of a circumferential ring seal which does not require any modifications to the rings themselves other than possibly making the ring gaps slightly larger.

Another object is to provide a circumferential ring seal in which the orientation of the rings is maintained by engagement of the anti-rotation device with the ring gaps from one side of the seal.

In accordance with the present invention, the anti-rotation device consists of a thin washer placed on the pressure side of the ring seal. Axially protruding from the side of the washer facing the ring seal are a plurality of circumferentially and radially spaced tabs adapted to be received in the respective gaps in the inner and outer rings.

Also in accordance with the invention, the tabs are desirably located approximately 180° apart to keep the respective gaps in the inner and outer rings on diametrically opposite sides of the ring seal.

Further in accordance with the invention, the tab for the inner ring is desirably located near the inner diameter (I.D.) of the washer and does not extend toward the outer diameter (O.D.) any further than the I.D. of the outer ring.

Also in accordance with the invention, the tab for the outer ring is desirably located near the O.D. of the washer and does not extend toward the I.D. any further than the O.D. of the inner ring.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a preferred form of anti-rotation device according to the invention shown in association with a typical contracting rod ring seal;

FIG. 2 is an exploded isometric view of the ring seal and anti-rotation device of FIG. 1 shown in disassembled form; and FIG. 3 is a transverse section through the seal and anti-rotation device of FIG. 1 taken substantially along the plane of the line 3—3 thereof.

DETAILED DESCRIPTION OF THE PREFERRED EMBODIMENT

Referring now in detail to the drawings, FIGS. 1 and 3 show a typical contracting-type seal 1 for use in preventing leakage of high pressure fluids or gases around a rod 2 protruding from a pressure vessel 3. The seal 1 desirably consists of a pair of concentric split rings 5, 6 contained in an annular groove or counterbore 7 in the end wall 8 of the vessel 3 surrounding a bore 9 through which the rod 2 extends. As shown, the inner ring 5 sealingly engages the O.D. of the rod 2 and extends radially outwardly into overlapping engagement with the radial wall 12 of the counterbore 7. Preferably such inner ring 5 includes a radial step cut joint or gap 10 generally of the configuration illustrated in FIG. 2 to prevent axial gap leakage. Radial gap leakage is controlled by the outer ring 6 which may have a straight cut joint or gap 11 (see FIG. 2) therein circumferentially spaced from the gap 10 in the inner ring 5.

When such a contracting rod ring seal is installed, the outer and inner ring gaps 10, 11 should be positioned out of alignment with each other as shown. However, notwithstanding such initial positioning, the gaps may align themselves due to combinations of pressure cycling, rod motion and/or vibrations and the like, causing excessive seal leakage.

In accordance with the present invention, alignment of the ring gaps 10, 11 is prevented by an anti-rotation device 15 which prevents relative rotation between the rings 5, 6 as described hereafter. As clearly shown in FIGS. 1 and 2, such anti-rotation device consists of a thin washer 16 which is placed on the pressure side of the ring seal 1. The washer 16 has a central opening 17 therethrough of a diameter somewhat greater than the O.D. of the rod 2 to permit the washer to be freely slid onto the rod.

Protruding axially from the side 18 of the washer facing the ring seal 1 are a pair of circumferentially and radially spaced tabs 19, 20 adapted to be received in the respective gaps 10, 11 in the inner and outer rings. The tabs 19, 20 are desirably located approximately 180° apart to keep the ring gaps on diametrically opposite sides of the seal as shown. Also, the tab 19 for the inner ring 5 is desirably located near the I.D. of the washer and does not extend toward the O.D. any further than the I.D. of the outer ring 6, whereas the tab 20 for the outer ring 6 is desirably located near the O.D. of the washer and does not extend toward the I.D. any further than the O.D. of the inner ring 5. Preferably, the tab 19 has a radial height just slightly less than the radial height of gap 10 in the inner ring 5, whereas the tab 20 may have a radial height approximately the same as the gap 11 in the outer ring 6.

To retain the ring seal 1 within the groove 7 in the pressure vessel 3 with the washer 16 up against the pressure side of the seal and the tabs 19, 20 extending into the respective gaps 10, 11 as shown in FIG. 1, a retaining ring or back-up ring 22 may be placed adjacent the side 23 of the washer opposite the side 18 from which the tabs project. To prevent any axial loads from being applied to the seal and washer by the retaining ring, a shoulder 24 may be provided on the inner wall of the pressure vessel for engagement by the retaining ring. Also, the retaining ring 22 may be held in place in conventional manner as by the use of a snap ring 25 or the like.

Any suitable method may be used to fabricate the anti-rotation device 15, depending on cost and application parameters. For example, the device 15 may comprise a welded assembly formed from sheet or shim stock. Alternatively, the device may be machined from bar stock or precision cast or forged, or formed from powdered metal or from molded material as desired.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the claims.

I claim:

1. In combination, a circumferential ring seal including concentric inner and outer rings each having a joint gap therein, and anti-rotation means for maintaining the respective joint gaps in said rings out of alignment with each other, said anti-rotation means comprising an annular washer adapted to be placed adjacent one side of said seal, said washer having a pair of circumferentially and radially spaced tabs protruding axially from the side of said washer facing said seal, said tabs being adapted to be received in the respective joint gaps in said inner and outer rings.

2. The combination of claim 1 wherein said tabs are located approximately 180° apart to keep the respective joint gaps in said rings on diametrically opposite sides of said seal.

3. The combination of claim 1 wherein said washer has a central opening therein, and the tab for said inner ring is located near the inner diameter of said washer and does not extend toward the outer diameter any further than the inner diameter of said outer ring.

4. The combination of claim 3 wherein said tab for said outer ring is located near the outer diameter of said washer and does not extend toward the inner diameter any further than the outer diameter of said inner ring.

5. The combination of claim 4 wherein the tab for said inner ring has a radial height slightly less than the radial height of the joint gap in said inner ring.

6. The combination of claim 4 wherein the tab for said outer ring has a radial height approximately the same as the radial height of said joint gap therein.

7. The combination of claim 1 further comprising a rod extending through an opening in an end wall of a vessel, said seal surrounding said rod to form a fluid-tight joint between said rod and the wall of said opening, said washer being disposed adjacent the pressure side of said seal, and means for retaining said seal and washer within said vessel adjacent said end wall.

8. The combination of claim 7 wherein said vessel has a counterbore in said end wall for receipt of said seal and washer, and said means for retaining said seal and washer within said vessel adjacent said end wall includes a back-up ring adjacent the side of said washer opposite said tabs.

9. The combination of claim 8 further comprising a shoulder on the inner wall of said vessel adjacent said counterbore which is engaged by said back-up ring to prevent any axial loads from being applied to said seal and washer by said retaining ring.

10. The combination of claim 9 further comprising a snap-ring for retaining said back-up ring against said shoulder.

11. In combination, a circumferential ring seal including concentric inner and outer rings each having a joint gap therein, and a washer adapted to be placed adjacent one side of said seal, said washer having a pair of circumferentially and radially spaced tabs protruding axially from the side of said washer facing said seal, said tabs being adapted to be received in the respective joint gaps in said inner and outer rings, said tab for said inner ring having a radial height slightly less than the radial height of the joint gap in said inner ring.

12. The combination of claim 11 wherein the tab for said outer ring has a radial height approximately the same as the radial height of the joint gap in said outer ring.

13. An anti-rotation device for contracting rod ring seals of the type including concentric inner and outer rings each having a joint gap therein, comprising a washer having a pair of circumferentially and radially spaced tabs protruding axially from one side of said washer, said tabs being adapted to be received in the respective joint gaps in said inner and outer rings, said washer having a central opening therein, the tab for said inner ring being located near the inner diameter of said washer and having a radial height slightly less than the radial height of the joint gap in said inner ring, and the tab for said outer ring being located near the outer diameter of said washer and having a radial height approximating the radial height of the joint gap in said outer ring.

14. The device of claim 13 wherein said tabs are located approximately 180° apart to keep the respective joint gaps in said rings on diametrically opposite sides of said seal.

* * * * *